United States Patent
Stratton et al.

[15] 3,637,319
[45] Jan. 25, 1972

[54] METHOD FOR DUAL MODE CONTROL CHANGEOVER IN A STEAM TURBINE

[72] Inventors: Jerry L. Stratton, Canon City, Colo.; George W. Kessler, Schenectady, N.Y.

[73] Assignee: General Electric Company

[22] Filed: Dec. 8, 1969

[21] Appl. No.: 883,221

[52] U.S. Cl..............................................415/1
[51] Int. Cl................................................F01d 7/00
[58] Field of Search....................................415/1

[56] References Cited

UNITED STATES PATENTS 3,403,892  10/1968  Eggenberger et al.....................415/1

Primary Examiner—C. J. Husar
Attorney—Paul A. Frank, John F. Ahern, Julius J. Zaskalicky, Frank L. Neuhauser, Oscar B. Waddell and Joseph B. Forman

[57] ABSTRACT

A dual mode control system is disclosed wherein the changeover from one mode to the other is made by the use of time ratio switching. A pulse generator produces a series of pulses whose duty cycle varies from zero to 100 percent and controls a switching element to accomplish the changeover in accordance with the percent duty cycle.

3 Claims, 4 Drawing Figures

Inventors:
Jerry L. Stratton,
George W. Kessler,
by Paul A. Frank
Their Attorney.

METHOD FOR DUAL MODE CONTROL CHANGEOVER IN A STEAM TURBINE

This invention relates generally to multimode control systems wherein it is desired to change over from one mode of operation to another without introducing transients in the controlled system. A specific example of this is in the field of steam-turbine-generator control systems, where it is desired to switch from "partial arc" to "full arc" control. The "arc" referred to relates to the steam inlets to the turbine positioned around the periphery thereof.

As is known, it is desirable to operate a steam-turbine-generator under "full arc" control during startup and when the generator is run under changing and full load conditions. This reduces the thermal stresses built up in the turbine. Under steady, partial load conditions, it is desirable to run the generator under "partial arc" control. This is achieved by fully opening the stop valves, which are upstream from the control valves, and opening the control valves sequentially and in variable amounts. In the full arc mode, the control valves are fully opened and control is achieved through the simultaneous actuation of the stop valves.

With the above considerations in mind, it is therefore an object of this invention to provide a control mode changeover system wherein the changeover is made using a time ratio switching technique.

It is a further object of the invention to provide a control mode changeover device wherein the changeover is made with a minimal amount of induced transients in the controlled device.

It is another object of the invention to provide a control mode changeover device wherein the changeover is made by a switching device operating in accordance with an input signal of variable duty cycle.

It is yet another object of the device to provide an improved multiple mode control device for a steam-turbine-generator.

It is a further object of the invention to provide a mode changeover system suitable for use with "dual admission" valves in a steam turbine control system.

It is another object of the invention to provide a method whereby a changeover is made between two modes of operation by alternately using the two modes of operation and progressively using one more than the other until a changeover is made from the other mode to the one.

The invention comprises a pulse generator for producing series of pulses of progressively varying duty cycles and a control system connected to the pulse generator which, in response to the pulses, progressively switches from one mode of operation to another.

The invention may be best understood by considering the following description taken in conjunction with the drawings in which.

Figure 1:
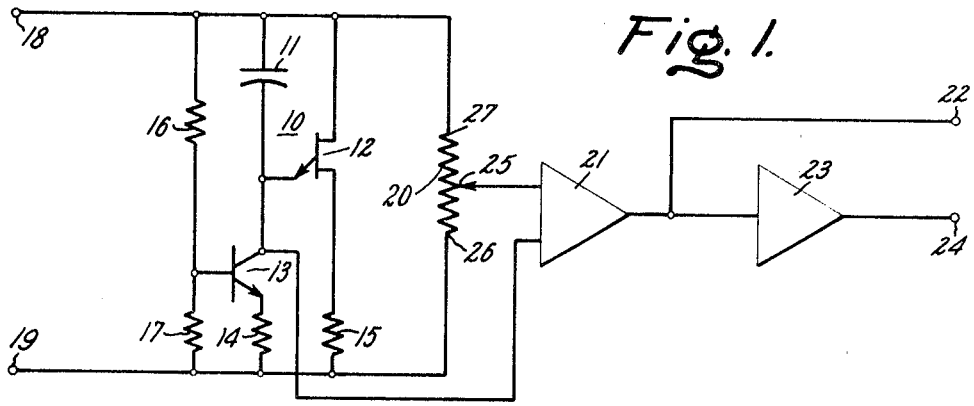
FIG. 1 illustrates a specific form of the pulse generator for use in the invention.

Referring to FIG. 1, there is illustrated a pulse generator suitable for use in the present invention. The pulse generator as illustrated generally comprises a unijunction relaxation oscillator producing a ramp output voltage, a source of variable voltage, a comparator for comparing the variable voltage and the ramp voltage to produce an output pulse proportional to the time one input exceeds the other, and an inverting amplifier connected to the output of the comparator.

Specifically, in FIG. 1 there is shown a unijunction relaxation oscillator 10 comprising a capacitor 11 and unijunction transistor 12 coupled in a timing circuit further including a transistor 13 connected to the capacitor 11. Bias resistors 14 and 15 are connected to transistors 13 and 12, respectively. The series network 16 and 17 provide a source of bias signal for the base of transistor 13. Also connected between the supply terminals 18 and 19 is a variable resistor 20 having a tap connected as one input to operational amplifier 21. A second input of operational amplifier 21 is connected to the junction of the capacitor 11 and transistor 13. The output of operational amplifier 21 is connected to an output terminal 22 and also to the input of operational amplifier 23 which provides an inverted or complementary output to output terminal 24.

Figure 2:
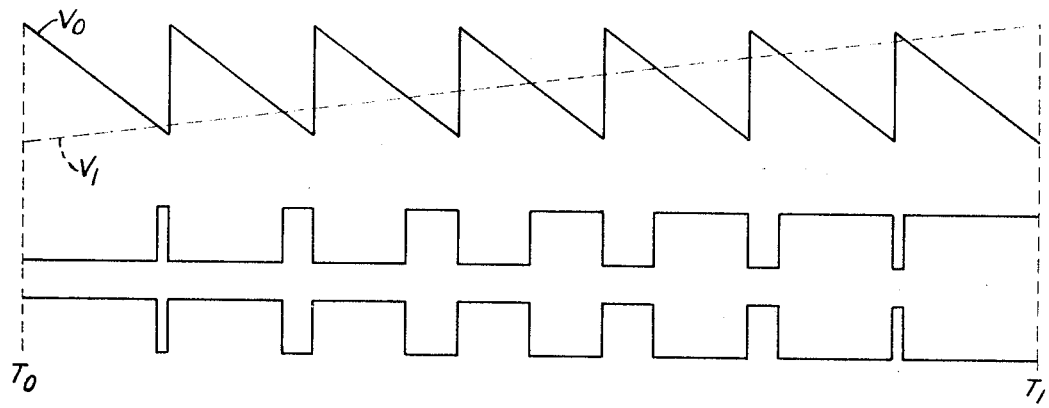
FIG. 2 illustrates a series of waveforms helpful in understanding the operation of the invention.

The operation of the circuit of FIG. 1 may best be described utilizing the waveforms illustrated in FIG. 2. At an initial time $T_0$, with no charge on the capacitor 11, a maximum voltage drop occurs across transistor 13 and resistor 14 which is coupled as one output to the operational amplifiers 21. This voltage is shown in FIG. 2 $V_0$. As time passes, a charge accumulates on capacitor 11 decreasing the voltage drop across the transistor 13 and resistor 14. At a particular voltage on capacitor 11, the unijunction transistor 12 fires, discharging capacitor 11 and returning the voltage drop across transistor 13 and resistor 14 to its maximum value. This is done repeatedly in the manner of a relaxation oscillator and produces the output waveform illustrated as $V_0$. Transistor 13, which acts as a variable resistor in the RC circuit 11, 13, and 14, linearizes the ramp voltage $V_0$.

The voltage on tap 25 of variable resistor 20 is illustrated in FIG. 2 as $V_1$. Operational amplifier 21 compares the relative voltages at its input terminals and produces an output pulse proportional to the length of time the ramp voltage $V_0$ generated by unijunction oscillator 10 is less than the input voltage $V_1$. Thus, as shown in FIG. 2, operational amplifier 21 produces a series of output pulses progressively increasing in duty cycle from zero to 100 percent. Operational amplifier 23 produces an inverted version of this waveform and supplies it to output terminal 24.

At time $T_0$, the voltage of tap 25 is at or near that of point 26. The ramp voltage is not lower than this voltage and therefore the output of amplifier 21 is a pulse series of 100 percent duty cycle. When the other mode of operation is desired, tap 25 is moved to point 27. As it is moved, the voltage $V_1$ at the tap increases so that the ramp voltage generated is less than the voltage $V_1$ for progressively longer periods of time until it is always less than $V_1$. At this time, $T_1$, the output of amplifier 21 is a series of pulses of zero percent duty cycle, i.e., no pulses. Thus, it can be seen from FIG. 2 the output of amplifier 21 is a series of pulses changing from 100 percent to zero percent duty cycle during the transition period.

The transition period, $T_0$ to $T_1$, may take as many cycles of the oscillator 10 as desired provided enough cycles occur that the changeover is not abrupt.

The position of tap 25 can be varied by any suitable means (not shown) such as a motor or by hand. However the variable resistor 20 is operated, it should be noted that it has the capability of providing an interrupted changeover procedure. That is, not only can the changeover from a full arc to partial arc mode, and vice versa, be made, but also the changeover procedure can be stopped at any point and reversed. That is, halfway between full arc mode the changeover procedure can be stopped and returned back to the partial arc mode as shown in FIG. 2. The use of variable resistor 20 as a source of voltage $V_1$ is by way of example only. Any suitable source producing $V_1$ may be used.

Figure 3:
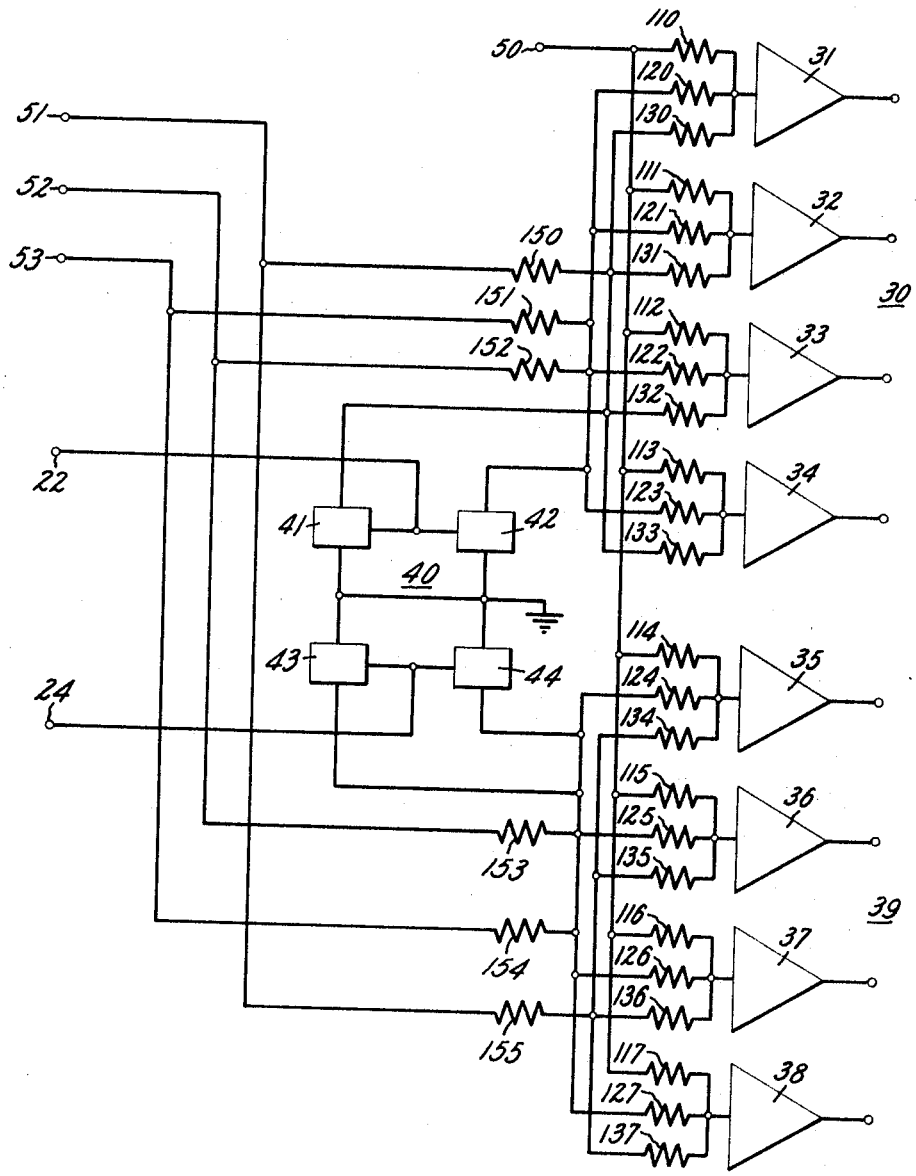
FIG. 3 illustrates a specific form of control apparatus which varies from one mode of operation to another under the control of pulses from the pulse generator.

FIG. 3 illustrates, in block form, one embodiment of a suitable dual mode control apparatus for carrying out the present invention. The control apparatus comprises a first bank 30 of operational amplifiers 31–34 which serve to control the stop valves in an electrohydraulic control system and a second bank 39 of operational amplifiers 35–38 which serve to control the control valves in an electrohydraulic control system. Each amplifier has as one input a valve-opening bias signal from a source 50 applied over coupling resistors 110–117 to operational amplifiers 31–38 respectively. Each amplifier also has applied to one of its input terminals a valve-closing bias signal which is equal to and counteracts the valve-opening bias signal. The valve-closing bias signal from terminal 51 is coupled to the first bank of operational amplifiers by way of resistor 150, which serves as a proportioning element, and resistors 130–133. The valve-closing bias signal is coupled to the second bank 39 of amplifiers by proportioning resistor 155 and input resistors 134–137 respectively. A speed signal and a load signal are proportionately summed by resistors 151 and 152 and together applied as a third signal to the input terminal of the first bank of amplifiers by way of elements 120–123 respectively. The speed signal and load signal are also summed proportionately by elements 153 and 154 and are applied to a third input terminal of the second bank of operational amplifiers by way of coupling elements 124–127. Also, shown in FIG. 3 is a switching means 40 comprising four switching elements 41–44 which determine which set of valves is activated. Switch 41 is connected to the valve-closing bias signal input of the first bank of amplifiers. Switch 42 is connected to the speed-load signal input line of the first bank of operational amplifiers. Switch 43 is connected to the closing bias signal line of the second bank of operational amplifiers. Switch 44 is connected to the speed-load input line of the second bank of operational amplifiers. These switches, when activated, serve to shunt their respective lines to ground thereby eliminating that input from its respective bank of amplifiers.

The overall operation of the circuitry shown in FIG. 3 is as follows.

Assuming switches 41 and 42 to be in the "off" or open state and switches 43 and 44 to be in the "on" or closed state, the speed and load signals and valve-closing bias signals are applied to the first bank 30 of operational amplifiers thereby rendering them active. The speed-load signal and valve-closing bias signal are shunted to ground by switches 43 and 44 and therefore are not applied as an input to the second bank of operational amplifiers, thereby rendering them inactive.

When the input signals to the switching elements reverse, switches 41 and 42 will be in the "on" state and switches 43 and 44 will be in the "off" state. Thus, switches 41 and 42 shunt to ground the input signals to the first bank of operational amplifiers and the switches 43 and 44 permit the speed-load signals and the valve-closing bias signal to be applied as an input signal to the second bank 39 of operational amplifiers.

When the switches 41 and 42 are in the "off" state, the valve-closing bias signal counteracts the valve-opening bias signal rendering the first bank of operational amplifiers sensitive to the speed-load signals from sources 52 and 53. With switches 43 and 44 in the "on" state, the only input signal to the second bank of operational amplifiers is the valve-opening bias signal from source 50. This renders the control valves full open and the system functions in the full arc mode. When the situation is reversed and switches 41 and 42 are in the "on" state and the switches 43 and 44 are in the "off" state, the only signal applied as an input to the first bank of operational amplifiers is the valve-opening bias signal. The valve-closing bias signal and the speed-load signal are shunted to ground. Under these circumstances, the first bank of operational amplifiers opens the stop valves completely and enables the control circuit to function in the partial arc mode. The valve-closing bias signal is applied as an input signal to the second bank of operational amplifier circuits and counteracts the valve-opening bias signal enabling the second bank of operational amplifier circuits to be actuated by the speed-load signals. The relative proportioning by the resistive elements in the input circuit enables the system to operate in the partial arc control mode.

The respective values of the various input elements to the operational amplifier banks may have any desired proportioning. The switching means 40 can also be of any desired variety under the control of the switching signals from the pulse generator illustrated in FIG. 2. For example, the switches may be of the electromechanical variety or transistorized.

Figure 4:
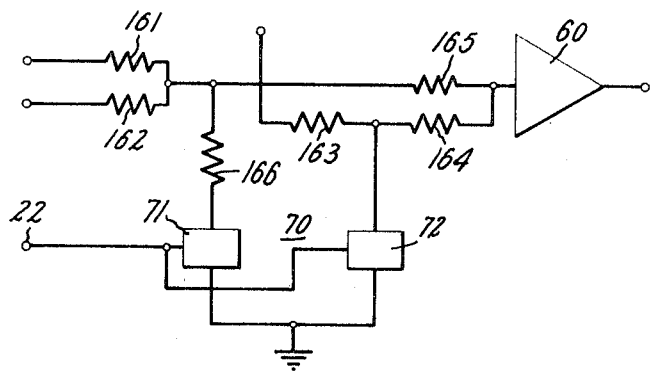
FIG. 4 illustrates another form of control device changing its mode of operation in accordance with the pulses from the pulse generator.

The circuit shown in FIG. 4 is another embodiment of dual mode control apparatus suitable for use with what is known in the art as dual admission valves. These valves combine in one set of valves the functions performed by the stop and control valves used with the circuit of FIG. 2. In this circuit, a single operational amplifier 60 receives as one input signal speed and load signals proportionately summed by elements 161 and 162 and coupled to the operational amplifier by coupling element 165. Operational amplifier 60 receives as another input signal a valve-closing bias signal coupled to the input by way of proportioning element 163 and coupling element 164. A switching means 70 comprising switching elements 71 and 72 are connected to shunt only a portion of the input signals to ground, thereby allowing the amplifier to operate at two levels of amplitude for a given set of signals. In this embodiment, switches 71 and 72 function together from the same source of signal from the pulse generator as shown in FIG. 2. However, they could also function in an opposite fashion as with the two banks of control elements in FIG. 3, depending upon the type of switching element chosen and the input bias signal to the switching elements.

Having thus described the invention, it will be apparent to those of ordinary skill in the art that many modifications can be made achieving the same objectives as the present invention and falling within the scope of the present invention.

What we claim as new and desire to secure by Letters Patent of the United States is:

1. The method of shifting from full arc to partial arc operation, and vice versa, in a steam-turbine-generator system comprising the steps of:

controlling the steam-turbine-generator in one of said partial arc or full arc modes of operation in accordance with a control signal having a first amplitude level;

alternately switching at a given rate the steam-turbine-generator control signal between said first amplitude level and a second amplitude level corresponding to the other of said modes of operation whereby the steam-turbine-generator control signal is at said second amplitude level for a successively larger fraction of the switching cycle; and controlling the steam-turbine-generator in the other of said modes of operation in accordance with said control signal for as long as desired after a predetermined number of cycles of switching.

2. The method as set forth in claim 1 wherein said switching step is carried out in accordance with the percent duty cycle of a variable duty cycle electrical pulse train.

3. The method as set forth in claim 2 wherein said variable duty cycle electrical pulse train is obtained by:

generating a sawtooth waveform electrical signal at a first frequency;

generating a voltage signal variable in amplitude between a first and a second limits, one limit corresponding to the partial arc mode of operation and the second limit corresponding to the full arc mode of operation; and comparing said signal and said voltage and producing a pulse train having a duty cycle varying in accordance with the time one signal exceeds the other in amplitude.

* * * * *